(12) United States Patent
Tanabe et al.

(10) Patent No.: US 7,057,840 B2
(45) Date of Patent: Jun. 6, 2006

(54) MAGNETIC RECORD AND PLAYBACK DEVICE

(75) Inventors: Naohisa Tanabe, Osaka (JP); Masashi Tsuda, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 249 days.

(21) Appl. No.: 10/446,864

(22) Filed: May 29, 2003

(65) Prior Publication Data
US 2003/0223146 A1    Dec. 4, 2003

(30) Foreign Application Priority Data
Jun. 3, 2002   (JP) ............................. 2002-161197
Jun. 7, 2002   (JP) ............................. 2002-167199

(51) Int. Cl.
G11B 15/48       (2006.01)
(52) U.S. Cl. .................................................. 360/73.05
(58) Field of Classification Search ................. 360/71, 360/85, 73.14
See application file for complete search history.

(56) References Cited

U.S. PATENT DOCUMENTS

| | | | | |
|---|---|---|---|---|
| 3,792,491 A | * | 2/1974 | Inaga ........................... | 360/71 |
| 3,939,491 A | * | 2/1976 | Shigeta ......................... | 386/59 |
| 4,578,725 A | * | 3/1986 | Muller ........................... | 360/85 |
| 4,616,274 A | * | 10/1986 | Nagaoka ...................... | 360/71 |
| 4,649,442 A | * | 3/1987 | Kunii et al. ................. | 360/72.2 |
| 4,704,644 A | * | 11/1987 | Takenouchi .................. | 360/85 |
| 4,855,846 A | * | 8/1989 | Hanatani et al. .............. | 360/84 |
| 4,930,024 A | * | 5/1990 | Kanda et al. ................. | 386/77 |
| 5,510,899 A | * | 4/1996 | Kim ............................. | 386/69 |
| 5,912,781 A | * | 6/1999 | Imai ........................ | 360/73.14 |
| 5,974,221 A | * | 10/1999 | Kato et al. .................... | 386/68 |

\* cited by examiner

Primary Examiner—K. Wong
(74) Attorney, Agent, or Firm—Steptoe & Johnson LLP (57) ABSTRACT

With a magnetic record and playback device that permits rapid switching from fast forward (FF) mode or rewind (REW) mode to playback (FWD) mode, when it is necessary to switch rapidly from fast forward (FF) mode or rewind (REW) mode to playback (FWD) mode, the device is operated in a first take-up mode in which magnetic tape is wound on the rotating head drum, and when it is not necessary to switch rapidly from fast forward (FF) mode or rewind (REW) mode to playback (FWD) mode but is required to increase magnetic tape transport speed, the device is operated in a second take-up mode in which the magnetic tape is not wound on the rotating head drum, whereby it is possible to shorten the fast forward/rewind time by raising the transport speed of the magnetic tape without increasing the load on the magnetic tape or the magnetic head.

12 Claims, 10 Drawing Sheets

PRIOR ART

MAGNETIC RECORD AND PLAYBACK DEVICE

BACKGROUND OF THE INVENTION

1. Field of the Invention

The present invention relates to a magnetic record and playback device such as a video cassette tape recorder that causes a magnetic tape to run so as to be withdrawn from a cassette and wound on a rotating head drum, and that executes the recording or playback of a signal on the magnetic tape by unit of a magnetic head which is mounted on the rotating head drum.

2. Description of the Related Art

In recent years, amidst the usage of a variety of record and playback media, disk-like recording media have come into widespread use because of the advantageous access speed they afford.

On the other hand, concerning magnetic tapes which predominate in recording capacity, attempts have been made to improve the convenience of using them by increasing the rotational speed of the motor that drives the run of the magnetic tapes so as to raise the take-up run speed of the magnetic tapes and hence shorten the fast forward and rewind times.

A conventional magnetic record and playback device in which the magnetic tape is the recording medium will be described below.

Figure 9:
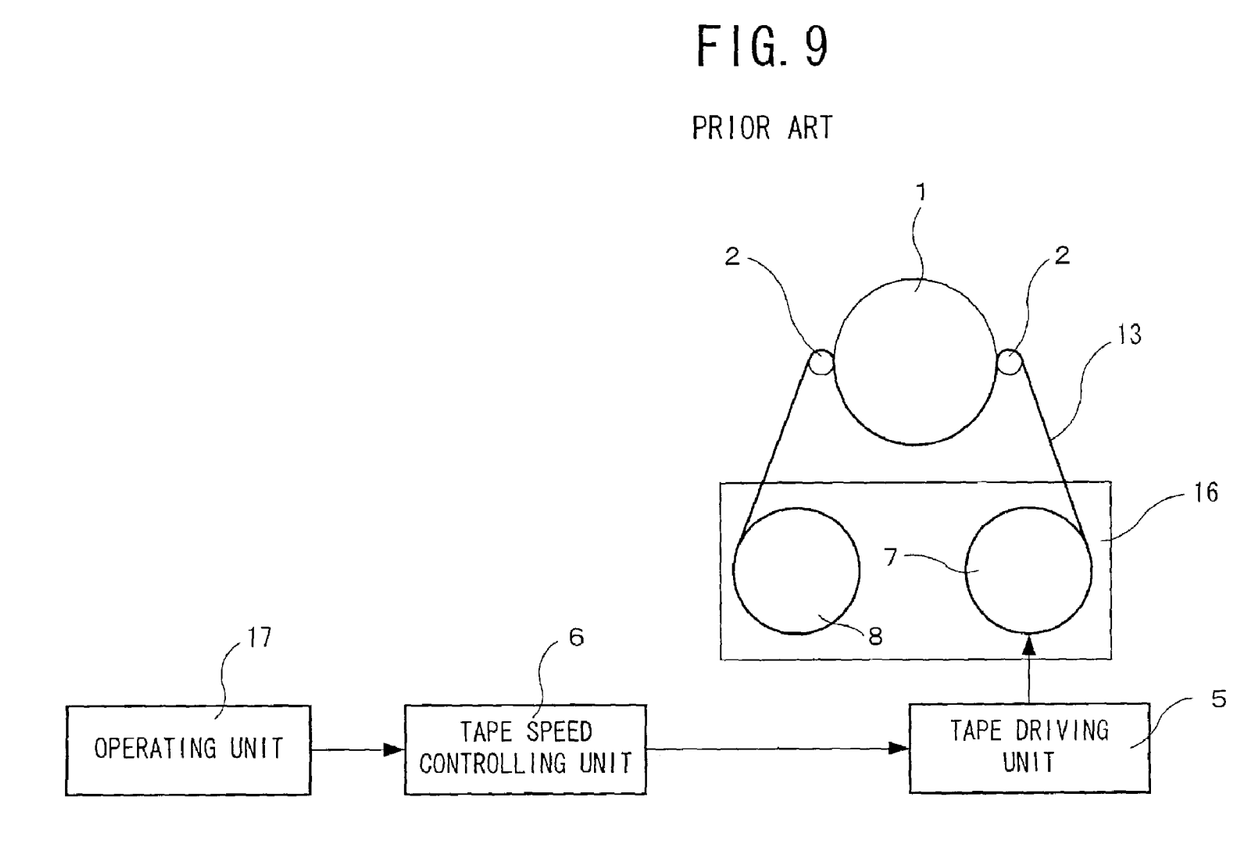
FIG. 9 is a block diagram of a conventional magnetic record and playback device.

FIG. 9 schematically depicts a conventional magnetic record and playback device, and shows a constitution required during a fast forward/rewind operation.

In FIG. 9, a cassette 16 that is employed when placed in the magnetic record and playback device contains a take-up reel 7, a feed reel 8, and a magnetic tape 13. The end of the magnetic tape 13 is connected to and wound on the feed reel 8, and the start end of the magnetic tape 13 is connected to the take-up reel 7.

5 denotes a tape driving unit comprising a capstan motor, and 6 denotes a tape speed controlling unit for controlling the rotational speed of the tape driving unit 5.

In a record/playback (FWD) mode, the magnetic tape 13, which is withdrawn by tape guides 2 from the cassette 16 placed in the magnetic record and playback device, in a state of being wound at a predetermined angle on a rotating head drum 1 of the magnetic record and playback device, is driven by the tape driving unit 5 so as to run from the feed reel 8 toward the take-up reel 7, and is taken up by the take-up reel 7 to which the rotation of the tape driving unit 5 is transmitted via a belt and gears, and the like. A magnetic head (not illustrated) is mounted on the rotating head drum 1 and records or plays back image and voice signals and so forth on the magnetic tape 13.

In a rewind (REW) mode, the magnetic tape 13, which is in a state of being wound at a predetermined angle on the rotating head drum 1 of the magnetic record and playback device, is driven by the tape driving unit 5 so as to run from the feed reel 8 toward the take-up reel 7 and be taken up by the take-up reel 7 to which the rotation of the tape driving unit 5 is transmitted via the belt and gears and the like.

In a fast forward (FF) mode, the magnetic tape 13, which is in a state of being wound at a predetermined angle on the rotating head drum 1 of the magnetic record and playback device, is driven by the tape driving unit 5 so as to run from the take-up reel 7 toward the feed reel 8 and be taken up by the feed reel 8 to which the rotation of the tape driving unit 5 is transmitted via the belt and gears and the like.

17 denotes an operating unit which supplies instructions for fast forward(FF)/rewind(REW) operations to the tape speed controlling unit 6.

The fast forward(FF)/rewind(REW) operations of a conventional magnetic record and playback device will now be described in more detail.

The fast forward(FF)/rewind(REW) operations are performed in the fast forward/rewind mode in which the magnetic tape 13 is wound on the rotating head drum 1 by unit of the tape guides 2, which mode constitutes a mechanism mode.

In a case where the record/playback (FWD) state is switched to the fast forward(FF)/rewind(REW) operation, such switching is performed after the mechanism mode changes from the record/playback mode to the fast forward/rewind mode.

In the record/playback (FWD) and fast forward(FF)/rewind(REW) modes, the magnetic tape 13 is withdrawn from the cassette 16 by the tape guides 2, and, in a state of being wound on the rotating head drum 1 at a predetermined angle as shown, runs while being regulated in the height direction thereof by the tape guides 2.

The tape driving unit 5, during the fast forward/rewind operations, rotates at a high speed while being controlled by the tape speed controlling unit 6. The run speed of the magnetic tape 13 at such time is faster than that of the record/playback (FWD) mode, that is 8 m/s, for example.

When the mechanism modes are thus constituted, in which the tape guides 2 need not be moved, the record/playback (FWD) mode can be switched to the fast forward (FF)/rewind(REW) mode rapidly. There is provided, accordingly, an advantage that switching between the record/playback (FWD) operation and the fast forward(FF)/rewind (REW) operation may be performed quickly.

To cite a specific usage example, in a tape editing operation in which only required images (first and second images) read out from the already recorded magnetic tape 13 are sent to a separate magnetic record and playback device so as to be re-recorded on a magnetic tape that is separate from the magnetic tape 13, the first playback image is read out from a current position on the magnetic tape 13, and then, in order to read out the second image recorded at a predetermined position toward the start end of the magnetic tape 13, the magnetic tape 13 is transported in a fast forward (FF) mode and the second image is then read out by switching to a playback (FWD) mode by unit of a manual operation at a position taken as corresponding to the predetermined position. The switching from the fast forward (FF) mode to the playback (FWD) mode is made rapidly without moving the tape guides 2.

Figure 10:
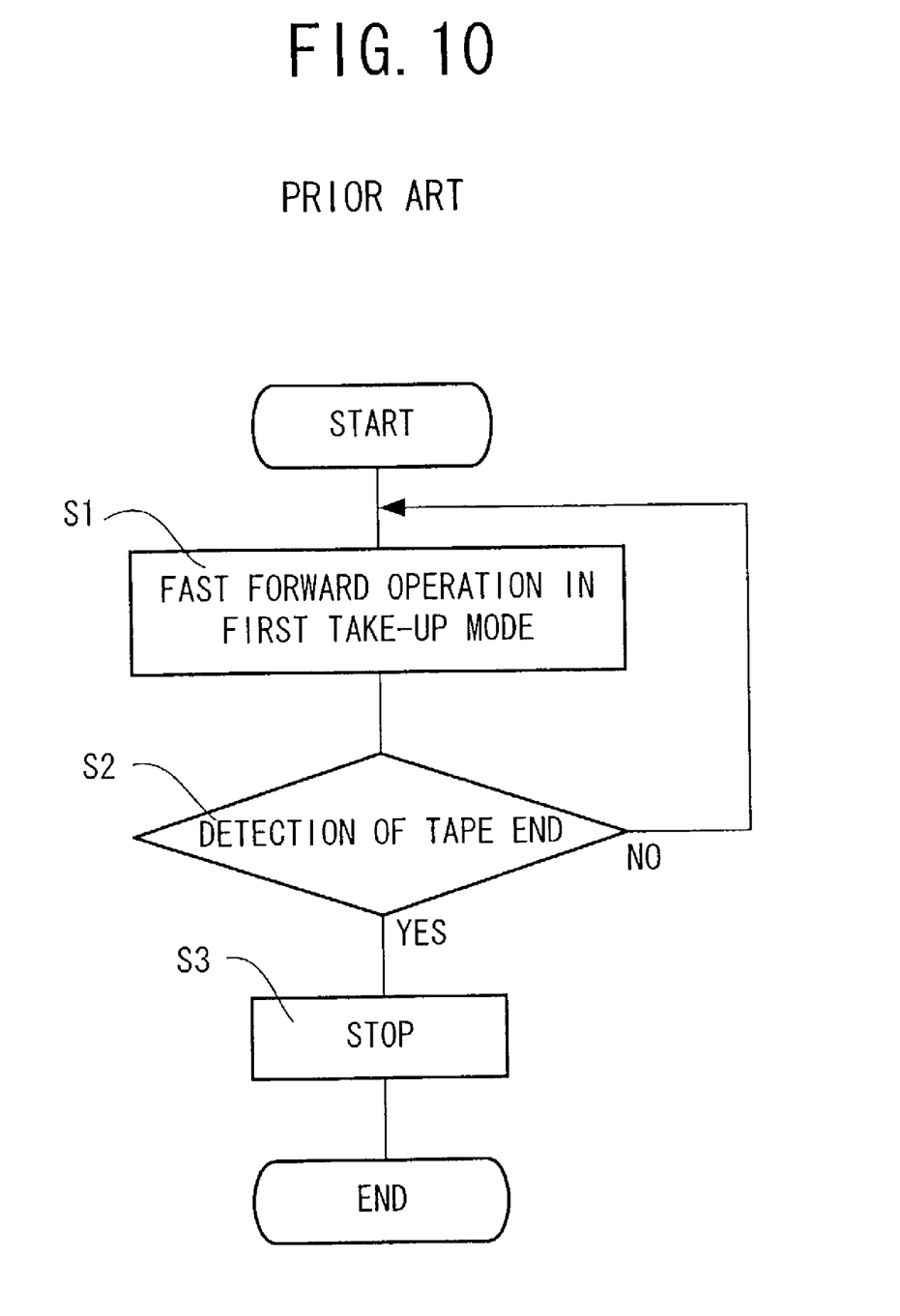
FIG. 10 is a flowchart of the conventional magnetic record and playback device.

Shown in FIG. 10 is the operation when the fast forwarding is started in a first take-up mode and the end of the magnetic tape is reached. When the fast forwarding (FF) operation is started in the first take-up mode in step S1, it is judged in step S2 whether or not the end of the magnetic tape 13 has been reached.

The fast forwarding (FF) operation in the first take-up mode is performed by executing step S1 repeatedly until the reader tape is detected in step S2.

When the reader tape is detected in step S2 and it is detected that the end of the magnetic tape 13 has been reached, step S3 is executed such that the fast forwarding (FF) operation in the first take-up mode is stopped, and the magnetic tape 13 is stopped from rinning, still in the first take-up mode.

However, even though there is a desire to further increase the speed of the rotation of the tape driving unit 5 in order to attempt further shortening of the fast forward(FF)/rewind (RWD) times, because the magnetic tape 13 is caused to run by being wound on the rotating head drum 1, according to the conventional constitution, the run load of the magnetic tape 13 increases and it is therefore difficult to raise the run speed of the magnetic tape 13. Also, when the run speed of the magnetic tape 13 increases, the burden on the magnetic tape 13 increases in such sections of the tape where the tape is wound on the rotating head drum 1 and where the height of the tape is regulated by the tape guides 2. Thus, the magnetic tape 13 and the magnetic head are threatened to be damaged, posing a problem.

SUMMARY OF THE INVENTION

The present invention resolves the conventional problems described above, an object thereof being to provide a magnetic record and playback device that permits rapid switching from a fast forward (FF) mode or rewind (REW) mode to a playback (FWD) mode, and that, depending on the application, permits an operation to accelerate the rotation of the tape driving unit 5 in an attempt to achieve further shortening of the fast forward(FF)/rewind(RWD) time.

In order to achieve the above object, the magnetic recording/playback device according to the present invention is a magnetic record and playback device for recording or playing back a signal in a state in which a magnetic tape is wound on a rotating head drum, comprising: a tape withdrawal unit for winding the magnetic tape on the rotating head drum at a predetermined angle; a mode switching unit for switching the tape withdrawal unit, in a fast forward or rewind operation for the magnetic tape, to a state corresponding to either a first take-up mode in which the magnetic tape is wound on the rotating head drum or a second take-up mode in which the tape is not wound thereon; and a tape driving unit for fast forwarding or rewinding the magnetic tape in the first take-up mode or second take-up mode, wherein speeds at which the magnetic tape is transported by the tape driving unit are such that the speed during the second take-up mode is set higher than the speed during the first take-up mode.

According to this constitution, in cases where it is necessary to switch rapidly from a fast forward (FF) mode or rewind (REW) mode to a playback (FWD) mode, the device is operated in a first take-up mode, and in cases where it is not necessary to switch rapidly from the fast forward (FF) mode or rewind (REW) mode to the playback (FWD) mode and where an increased magnetic tape transport speed is required, the device is operated in a second take-up mode, whereby it is possible to shorten the fast forward/rewind time by raising the transport speed of the magnetic tape without increasing the burden on the magnetic tape and the magnetic head, and the like.

Further, the magnetic record and playback device is constituted such that a signal is recorded or played back in a state in which the magnetic tape withdrawn from a cassette is wound on the rotating head drum, and the mode switching unit switches the tape withdrawal unit, in the second take-up mode, to a state in which the magnetic tape is not withdrawn from the cassette.

Further, the magnetic record and playback device is constituted such that a signal is recorded or played back in a state in which the magnetic tape withdrawn from a cassette is wound on the rotating head drum, and a control signal recorded on the magnetic tape is detected by unit of a control head; and, in the second take-up mode, the mode switching unit switches the tape withdrawal unit for winding the magnetic tape on the rotating head drum to a state in which the magnetic tape does not contact the rotating head drum and the control head but is withdrawn from the cassette.

Also, the magnetic record and playback device is constituted such that a signal is recorded or played back in a state in which the magnetic tape withdrawn from a cassette is wound on the rotating head drum, and a control signal recorded on the magnetic tape is detected by unit of a control head; and, in the second take-up mode, the mode switching unit switches the tape withdrawal unit for winding the magnetic tape on the rotating head drum to a state in which the magnetic tape is not wound on the rotating head drum but contacts the control head.

The magnetic record and playback device according to the present invention is a magnetic record and playback device for recording or playing back a signal in a state in which a magnetic tape is wound on a rotating head drum, comprising: a mode switching unit for switching a mechanism to an operation state that is either a first take-up mode corresponding to a state where the magnetic tape is wound on a rotating head cylinder, or a second take-up mode corresponding to a state where the magnetic tape is not wound on the rotating head cylinder; a tape driving unit for fast forwarding or rewinding the magnetic tape in a state corresponding to either the first take-up mode or the second take-up mode; and an end detecting unit for detecting the end of the magnetic tape, wherein the mode switching unit is constituted such that, when the end detecting unit detects the end during a fast forward operation in the first take-up mode, the mode switching unit stops the fast forward operation and then switches the mechanism operating mode to the second take-up mode and stops the tape driving unit.

According to this constitution, rewinding from the end of the magnetic tape to the start thereof in the second take-up mode is an operation in which rewinding is performed as a result of a second take-up mode rewind instruction being inputted, following a stop state in the second take-up mode. This rewinding is stopped when the start of the magnetic tape has been reached. Because the time interval required for mode switching from the first take-up mode to the second take-up mode is no longer required, the rewind time can be shortened.

In addition, the magnetic record and playback device is a magnetic record and playback device, wherein the mode switching unit is constituted such that, in the case of a rewind operation in the first take-up mode following a stop state in the second take-up mode, rewinding is executed after a switch has been made to the first take-up mode by the mode switching unit and the magnetic tape has been transported as far as the end thereof by the tape driving unit.

Furthermore, the magnetic record and playback device is constituted such that, when the magnetic tape is transported as far as its end by the tape driving unit after the mode switching unit has been allowed to execute a switch to the first take-up mode, the tape is transported as far as its end after stopping the operation of a counter.

Accordingly, when rewinding is performed in the first take-up mode following a stop state after the magnetic tape has been transported in the first take-up mode, the end of the magnetic tape has been reached, and a mode switch to the second take-up mode has been executed, rewinding is performed, first, by executing a mode switching to the first take-up mode and transporting the magnetic tape temporarily as far as its end without operating the counter display. Therefore, it is possible to avoid a lag between the position of the magnetic tape during rewinding and the counter display value, that is induced during the mode switching from the first take-up mode to the second take-up mode by the movement of the magnetic tape.

DESCRIPTION OF THE PREFERRED EMBODIMENTS

The present invention will be described below on the basis of embodiments.

First Embodiment

Figure 1:
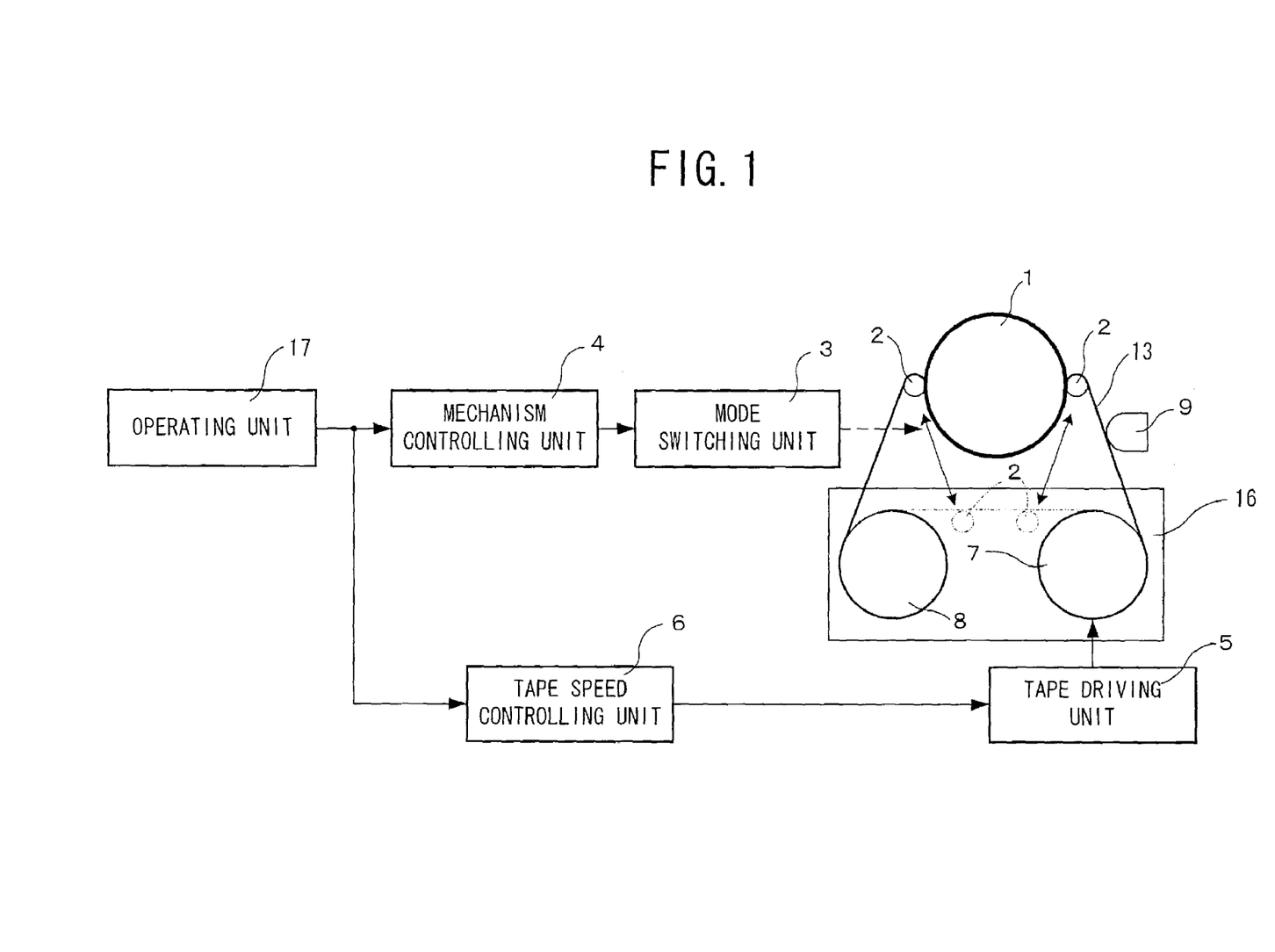
FIG. 1 is a schematic diagram of a magnetic record and playback device according to a first embodiment of the present invention.

FIG. 1 shows the magnetic record and playback device according to the first embodiment of the present invention.

The embodiment shown in this figure illustrates the constitution required during the fast forward or rewind operation of the magnetic record and playback device. Also, the description is provided such that the constituent elements in the same figure which are the same as those in FIG. 9 which illustrates a conventional example have been assigned the same reference numerals.

In FIG. 1, 3 denotes a mode switching unit for performing a mechanism mode switch in a fast forward(FF)/rewind (REW) operation. 4 denotes a mechanism controlling unit for controlling the mode switching unit 3 on the basis of operating instructions from the operating unit 17. 6 denotes a tape speed controlling unit for controlling the rotational speed of the tape driving unit 5 on the basis of the operating instructions from the operating unit 17.

9 denotes a control head for recording and detecting on the magnetic tape 13 a control signal that is employed in order to match the phase of the signals recorded and played back on the magnetic tape 13 and to display, in the form of a counter display, time positions of the magnetic tape 13.

According to the present embodiment, two mechanism modes for fast forwarding (FF)/rewinding (REW) the magnetic tape 13 are set, namely a first take-up mode and a second take-up mode in which the run paths of the magnetic tape 13 are different.

Figure 2:
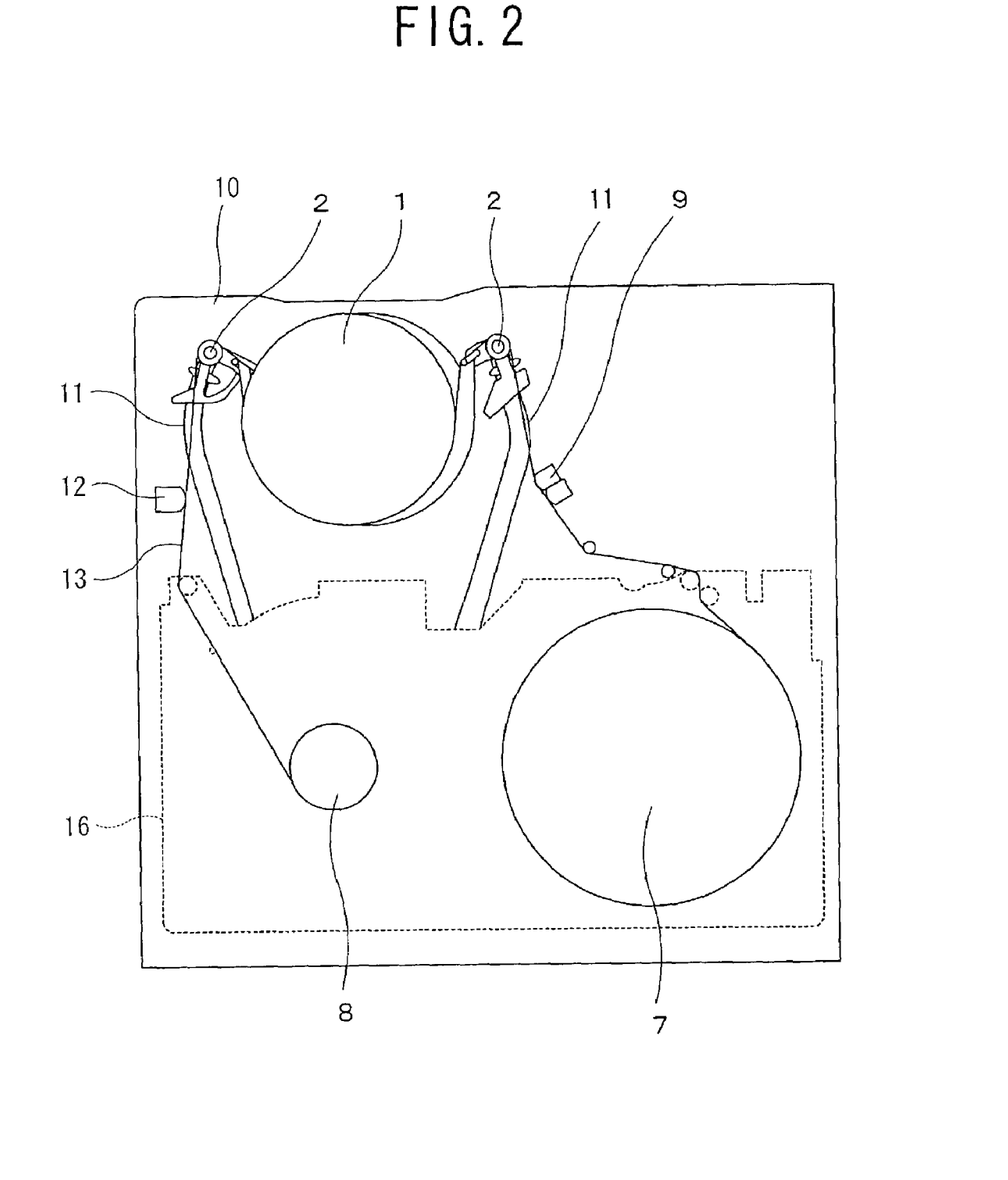
FIG. 2 is a plan view showing a first take-up mode according to the same embodiment.
Figure 3:
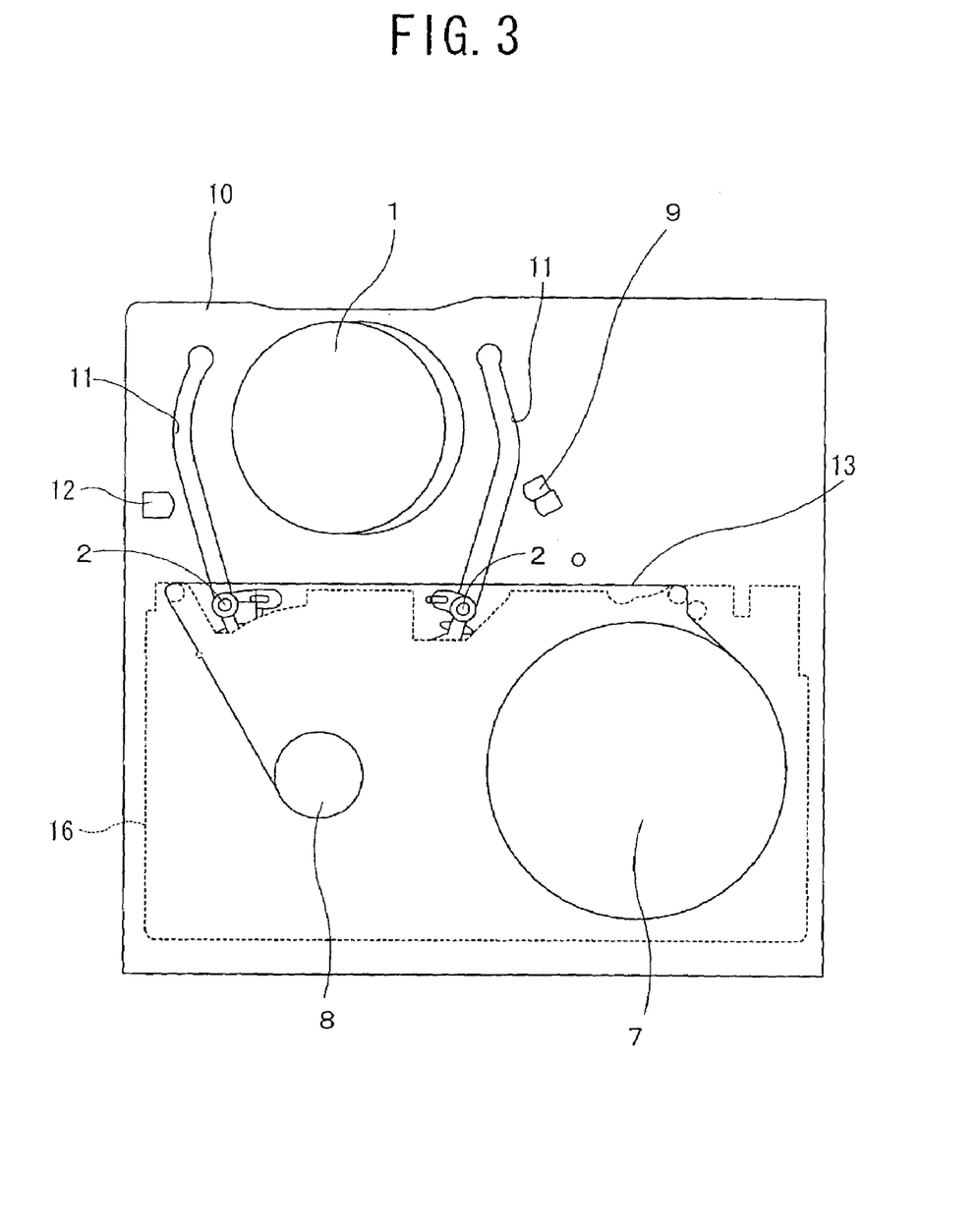
FIG. 3 is a plan view showing a second take-up mode according to the same embodiment.

FIG. 2 is a planar view of the magnetic record and playback device at the, time of the first take-up mode, and FIG. 3 is a planar view of the magnetic record and playback device at the time of the second take-up mode.

In FIGS. 2 and 3, 11 denotes tape guide slide grooves formed in a chassis 10 of the mechanism. The tape guides 2 that constitute a tape withdrawal unit are allowed to slide by these grooves. 12 denotes an erase head for erasing images and voice signals recorded on the magnetic tape 13.

The rewind(REW) operation will now be described using FIGS. 1 to 3.

The first take-up mode shown in FIG. 1 causes the magnetic tape 13 to be withdrawn from the cassette 16 by the tape guides 2 which constitute the tape withdrawal unit and which are moved by the mode switching unit 3, causes the tape to be wound at a predetermined angle on the rotating head drum 1 and to contact a control head 9, and, in a position in which the height direction of the tape is regulated by the tape guides 2, causes the magnetic tape 13 to be rewound from the take-up reel 7 in the cassette 16 toward the feed reel 8 by means of such elements as the tape driving unit 5 which comprises a capstan motor, and a belt and gears and the like which transmit the rotation of the tape driving unit 5 to the take-up reel 7.

In the first take-up mode and the record/playback(FWD) mode, the two positions of the tape guides 2 are the same. The first take-up mode shown in FIG. 2 is used in cases where importance is attached to the speed of operational switching between the record/playback (FWD) state and the fast forward (FF)/rewind(REW) state, and in cases where it is important to confirm, by unit of a counter display, the position of the magnetic tape 13 by detecting the control signal of the magnetic tape 13 during fast forwarding(FF)/ rewinding(REW) by unit of the control head 9.

On the other hand, the second take-up mode shown in FIG. 3 is a mode which does not withdraw the magnetic tape 13 from the cassette 16 and which performs fast forwarding (FF)/rewinding(REW) by unit of the tape driving unit 5 in a position in which the tape guides 2 do not contact the magnetic tape 13.

This mode is such that the magnetic tape 13 does not run while contacting the rotating head drum 1 and the control head 9 so that the run load is small and the run speed of the magnetic tape 13 can be raised easily. Hence, this mode is used mainly in cases where it is important to perform fast forward/rewind at a high speed.

The mechanism mode switch between the first take-up mode and the second take-up mode is executed as a result of an instruction to control the mode switching unit 3 being outputted by mechanism controlling unit 4 which is constituted in a microcomputer (not shown), such that the mode switching unit 3 operates so as to cause the tape guides 2 to move.

Further, the operation by the operating unit 17 is constituted so as to permit the selection of at least either a normal fast forward/rewind instruction (first take-up mode) or a high-speed fast forward/rewind instruction (second take-up mode). The mechanism controlling unit 4 controls the mode switching unit 3 in accordance with either of these two instructions, and the tape speed controlling unit 6 controls the tape driving unit 5 in accordance with either of the two instructions outputted by the operating unit 17, such that the transport speed of the magnetic tape 13 during the second take-up mode is higher than the speed during the first take-up mode.

As examples of these speeds, the speed is 8 m/s during the first take-up mode, and 10 m/s during the second take-up mode, for example. Here, although very little difference may be thought to exist between 8 m/s and 10 m/s, because these speeds are control target speeds, if consideration is paid to the time interval until these speeds are reached and to the time interval until the tape is decelerated from these speeds and then stopped, this difference is sufficiently noticeable.

Therefore, at the time of the first take-up mode, a switch is rapidly made from the record/playback mode to the fast forward/rewind mode, and, at the time of the second take-up mode, in order to reduce damage to the magnetic tape 13, a switch is made to the high-speed rewind mode after moving the tape guides 2 which constitute the tape withdrawal unit.

Thus, because, as mechanism modes permitting rewinding (REW), a first take-up mode for performing rewinding by winding the magnetic tape 13 on the rotating head drum 1 at a predetermined angle and causing the tape to contact the control head 9, and a second take-up mode for performing rewinding in a position in which the magnetic tape 13 is not withdrawn from the cassette 16 are set, the first take-up mode is employed in the case of an application in which importance is attached to the speed of switching between the record/playback mode and the rewind mode and in which rewinding is performed such that the position of the magnetic tape 13 is displayed as a counter display through detection of the control signal.

Furthermore, in the case of an application in which rewinding is performed at high speed, as is the case when the magnetic tape 13 runs as far as the end thereof and considerable rewinding is performed to the start of the tape, for example, without the control signal being detected to display the position of the magnetic tape 13 as a counter display, usage of the second take-up mode makes it possible to reduce the run load of the magnetic tape 13, and to easily raise the run speed of the magnetic tape 13, such that the rewind time can be shortened and the burden on the magnetic tape 13 and the magnetic head can also be reduced.

In the above description, a state in which the magnetic tape 13 was not withdrawn from the cassette 16 was assumed for the second take-up mode. However, a state where the magnetic tape 13 does not contact the rotating head drum 1 and the control head 9 but is withdrawn by the tape guides 2 from the cassette 16, that is, a state in which the tape guides 2 are withdrawn so as to approach positions midway between the rotating head drum 1 side and the cassette side in the tape guide slide grooves 11, is also acceptable for the second take-up mode.

Furthermore, a state in which the magnetic tape 13 is not wound on the rotating head drum 1 but contacts the control head 9 is also satisfactory for the second take-up mode.

A rewind state was described in the above embodiment but the description is also valid for a fast forward state. That is, fast forwarding and rewinding differ only in terms of the direction of run of the magnetic tape 13.

Second Embodiment

FIGS. 4 to 7 show the second embodiment.

Figure 4:
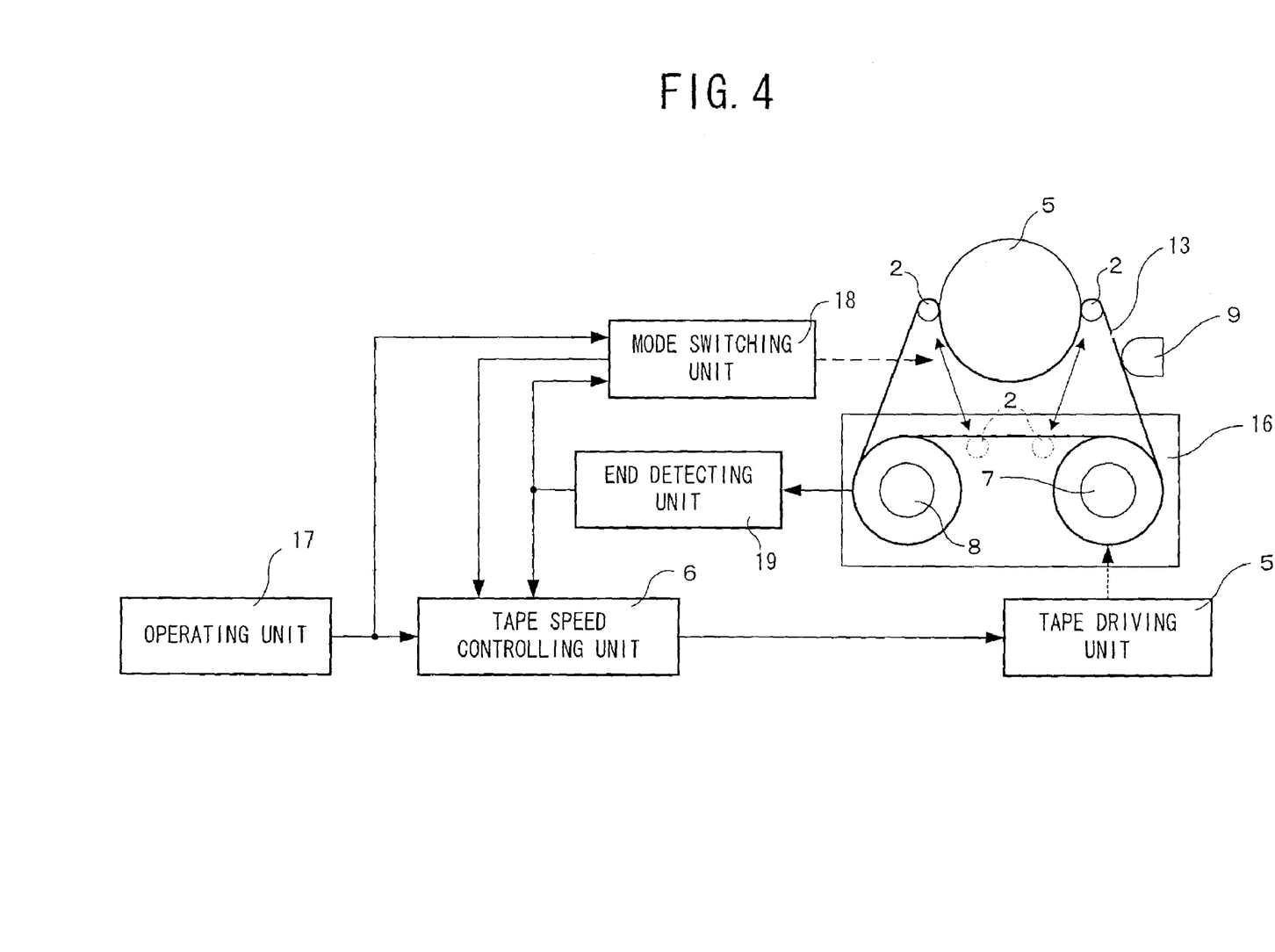
FIG. 4 is a schematic diagram of a magnetic record and playback device according to a second embodiment of the present invention.

FIG. 4 shows the magnetic record and playback device according to the second embodiment of the present invention and a description of this device is provided with the same reference symbols assigned to those parts which are the same as those in FIG. 1.

18 denotes a mode switching unit, same being constituted by a motor, gears, and a slide member, for example, for switching the mechanism operating mode by moving the tape guides 2.

Figure 5:
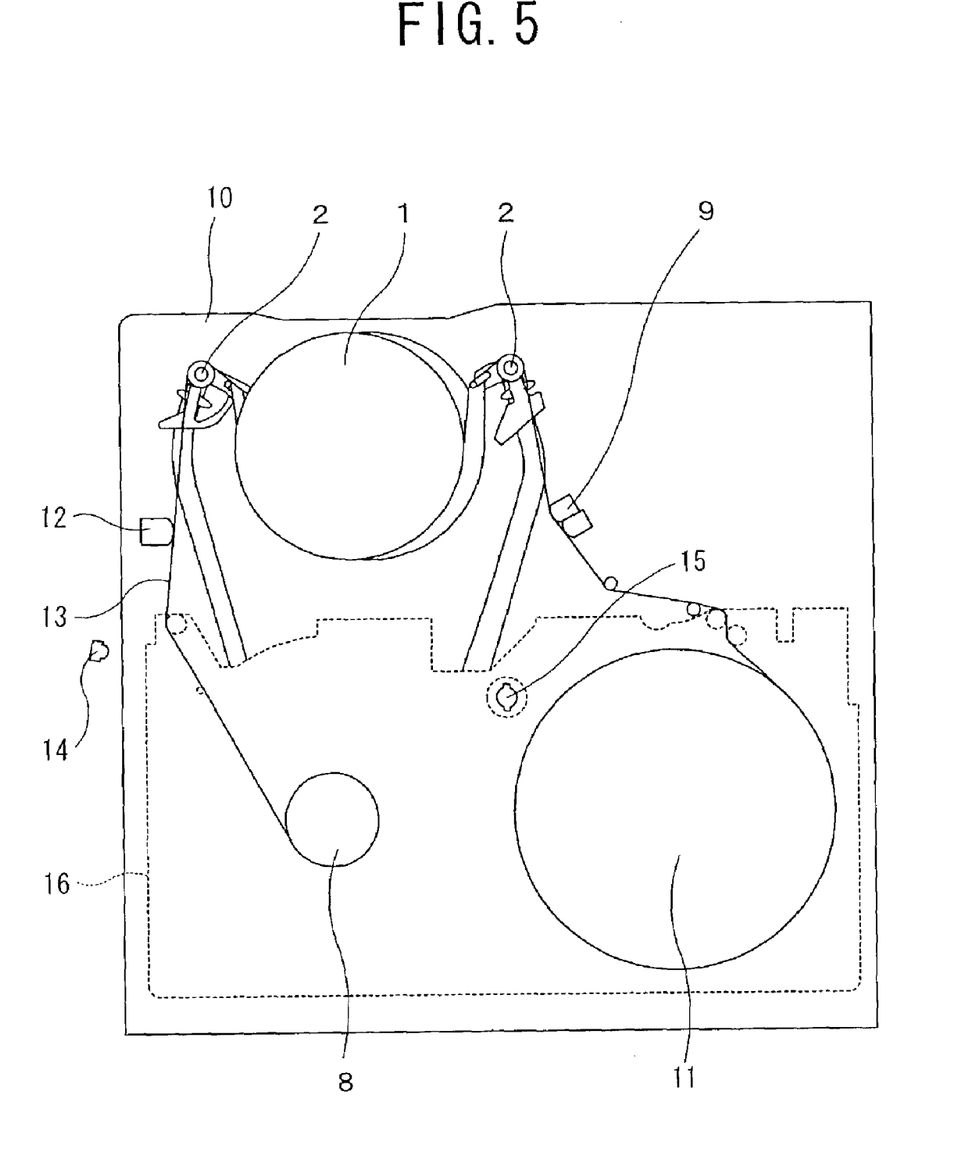
FIG. 5 is a plan view showing a first take-up mode according to the same embodiment.

19 denotes an end detecting unit for detecting the transparent reader tape at the end of the magnetic tape 13, this unit being constituted by the LED (light-emitting diode) receiver 14 and an LED emitter 15 that are shown in FIG. 5, for example.

Figure 6:
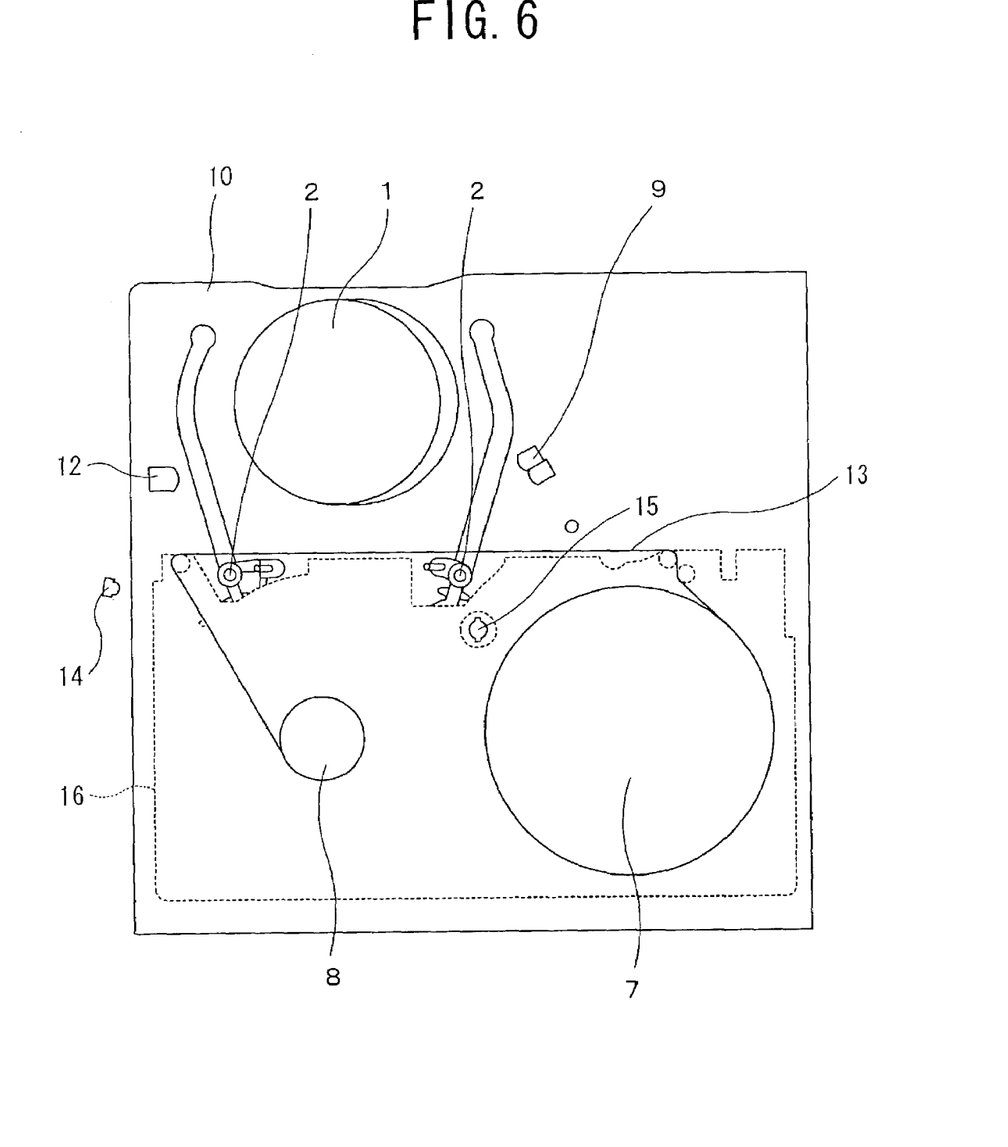
FIG. 6 is a plan view showing a second take-up mode according to the same embodiment.

Further, according to the magnetic record and playback device of this embodiment, two mechanism modes for rewinding the magnetic tape 13 are set, namely the first take-up mode and the second take-up mode in which the run paths of the magnetic tape 13 are different. FIG. 5 shows the state of the first take-up mode and FIG. 6 shows the second take-up mode.

The first take-up mode is a mode which withdraws the magnetic tape 13 from the cassette 16 by unit of the tape guides 2, winds the tape on the rotating head drum 1, and performs rewinding in a position in which the tape contacts the control head 6. This mode is characterized by permitting confirmation, via a counter display, of the position of the magnetic tape 13 through detection of the control signal from the magnetic tape 13 while same is rewound, and is used mainly in low-speed rewinding.

The second take-up mode is a mode that performs rewinding in a position in which the magnetic tape 13 is not withdrawn from the cassette 16 and is characterized in that the tape runs without contacting the rotating head drum 1 or the control head 6 and can therefore be rewound at high speed because the run load is small.

Figure 7:
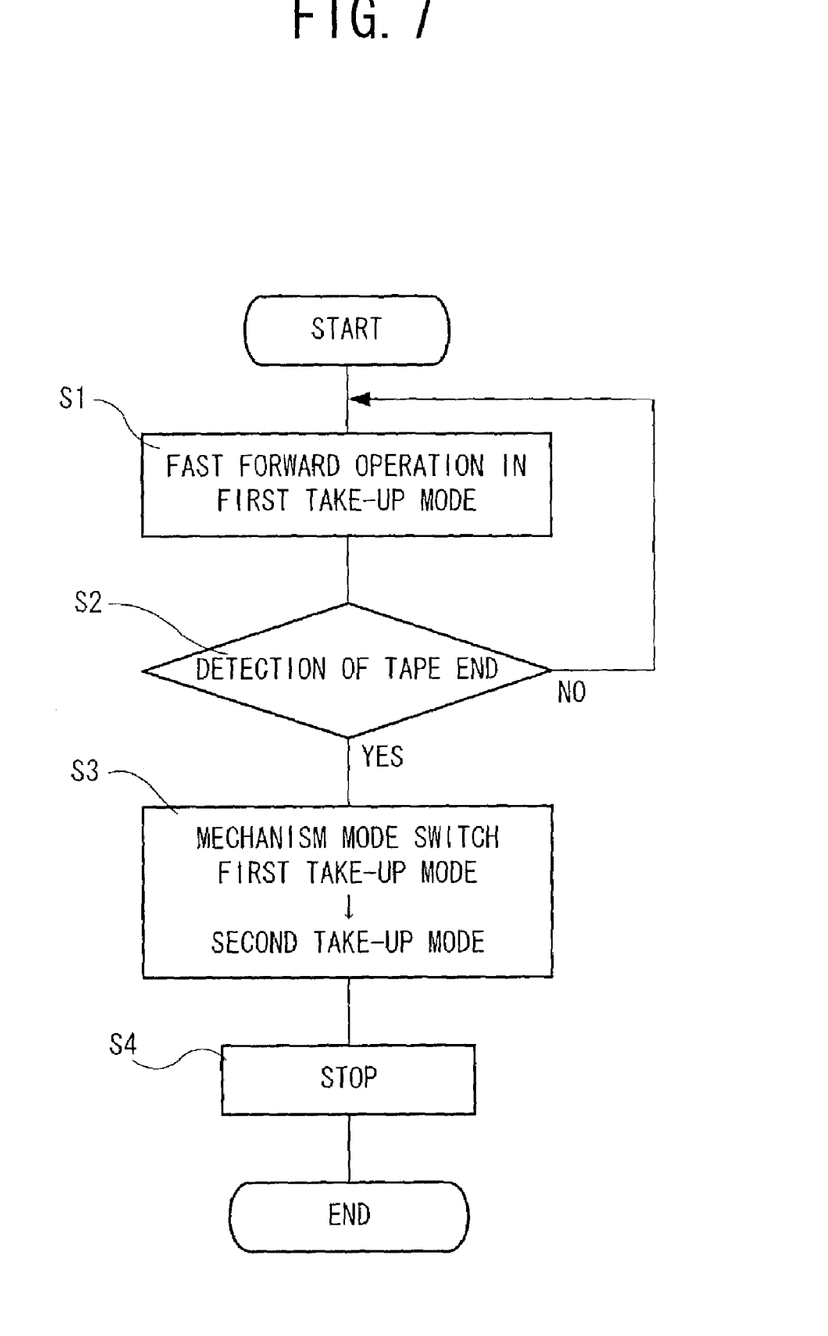
FIG. 7 is a flowchart according to the same embodiment.

A description will now be provided, with respect to a magnetic record and playback device of this constitution, of the operation when fast forwarding is performed in the first take-up mode and the end of the magnetic tape 13 is reached. FIG. 7 shows a flowchart of the corresponding operation.

In step S1, in the first take-up mode shown in FIG. 5, the tape driving unit 5 rotates under the control of the tape speed controlling unit 6, and the rotation of the tape driving unit 5 is transmitted to the take-up reel 7 by a belt and gears and the like (not shown). The take-up reel 7 rotates such that the magnetic tape 13 is taken up from the feed reel 8. Next, in step S2, when the end detecting unit 13 detects the transparent reader tape on the end of the magnetic tape 13 and the LED light of the LED emitter 15 is detected by the LED receiver 14, the tape driving unit 5 stops temporarily, and hence the rotation of the take-up reel 7 and the feed reel 8 also stops, meaning that the magnetic tape 13 stops. Thereafter, in step S3, the mode switching unit 18 causes the mechanism operating mode to switch from the first take-up mode to the second take-up mode that is shown in FIG. 6, and the tape guides 2 therefore move to the position for the second take-up mode. During the mode switch, the tape driving unit 5 is caused to rotate to cause the take-up reel 7 to rotate such that the magnetic tape 13 is taken up in an amount corresponding to the difference in length between the respective magnetic tape run paths of the first take-up mode and the second take-up mode, whereby a slackening of the magnetic tape 13 is prevented. When the mechanism operating mode reaches the second take-up mode, the rotation of the tape driving unit 5 is stopped once again in step S4, such that run of the magnetic tape 13 stops.

Then, in this state, in cases where a high-speed rewind instruction is issued by the operating unit 17, the tape driving unit 5 is controlled by the tape speed controlling unit 6 to perform high-speed rewinding (REW) without the mechanism operating mode being switched.

According to the embodiment described above, when the end of the magnetic tape 13 is reached by fast forwarding (FF) in the first take-up mode, because the tape driving stops automatically after the mechanism operating mode is switched to the second take-up mode, when the magnetic tape 13 is rewound from the end to the start thereof in the second take-up mode upon detection of a high-speed rewind instruction from the operating unit 17, a mode switch from the first take-up mode to the second take-up mode is not required and hence the time interval required for the mode switch is unnecessary. Consequently, the rewind time can be shortened in comparison with a conventional device that executes rewinding from the end of the magnetic tape 13 to the start thereof after switching from the first take-up mode to the second take-up mode upon detection of a high-speed rewind signal from the operating unit 17.

Third Embodiment

Figure 8:
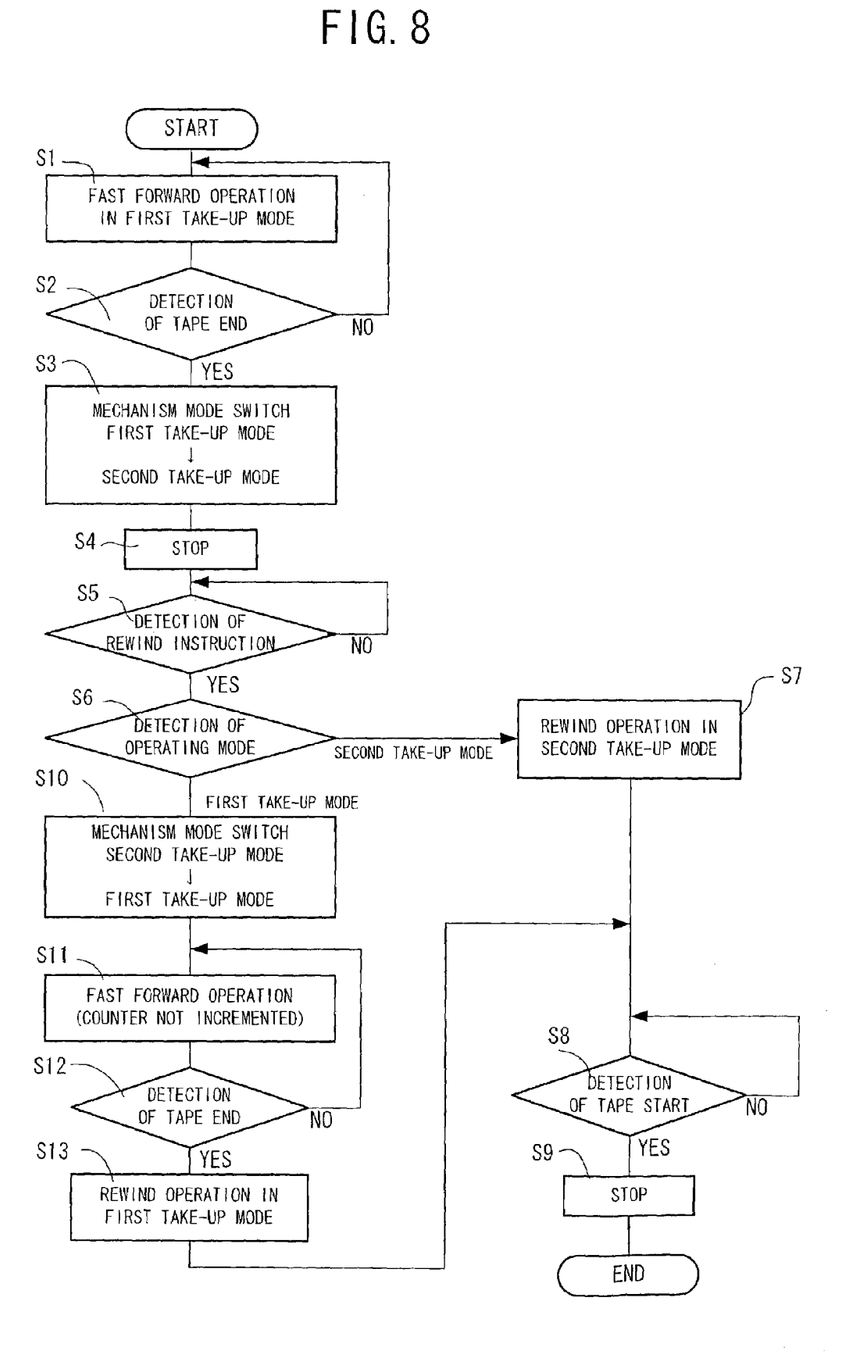
FIG. 8 is a flowchart for a magnetic record and playback device according to a third embodiment of the present invention.

FIG. 8 shows a flowchart of the magnetic record and playback device according to the third embodiment.

The mechanism and constitution requirements are almost the same as those of FIGS. 4, 5, and 6, but this embodiment differs from the second embodiment in that a routine to improve the reliability of the rewind operation which is executed after step S4 of the second embodiment is included.

The differences with respect to the second embodiment will now be described in detail.

FIG. 8 is a flowchart showing the operation during rewinding in the first take-up mode after the end of the magnetic tape has been reached by unit of fast forwarding in the first take-up mode and fast forwarding has been stopped.

The routine of steps S1 to S4 in FIG. 8 is the same as that in FIG. 7.

A description will now be provided for the operation when rewinding is executed in the first take-up mode after the end of the magnetic tape 13 has been reached by unit of fast forwarding in the first take-up mode and fast forwarding has been stopped.

In step S5, a judgment is made of whether or not a rewind instruction has been inputted. More specifically, it is judged if either of the normal rewind button and the high-speed rewind button of the operating button group of the operating unit 17 has been operated.

When it is detected in step S5 that either of the rewind buttons has been operated, it is judged in step S6 whether the rewind button whose operation was detected in step S5 is the normal rewind button or the high-speed rewind button.

When it is detected in step S6 that the high-speed rewind button has been operated, the routine corresponding to steps S7, S8 and S9 is executed.

In step S7, a high-speed rewind operation is started following on from the state in step S4 with the second take-up mode still in place and without performing a mechanism mode switch, and, when the start of the magnetic tape 13 is detected in step S8, processing moves to step S9 and the rewind operation is stopped.

When it is detected in step S6 that the normal rewind button has been operated, the routine corresponding to steps S10, S11, S12 and S13 is executed instead of step S7, whereupon step S8 is executed.

In step S10, a mechanism mode switch from the second take-up mode to the first take-up mode is performed.

Next, fast forwarding(FF) in the first take-up mode is performed in step S11, the counter display not advancing during this fast forwarding. The execution of step S11 makes it possible to remove the lag that lies between the position of the magnetic tape 13 and the counter display value and that is produced as a result of the tape guides 2 moving to execute mode switching from the second take-up mode to the first take-up mode in step S10.

Following the start of the fast forwarding(FF) in the first take-up mode of step S11, tape end detection is carried out in step S12 in the same way as in step S2 and step S11 is repeatedly executed until the end of the tape is detected in step S12.

Step S11 was described in terms of fast forwarding(FF) being performed in the first take-up mode but is not limited to this fast forwarding(FF). Normal playback(PLAY) and high-speed playback (CUE), and so forth, are also acceptable.

When the end of the tape is detected in step S12, rewinding in the first take-up mode is performed in step S13. In the rewind operation performed by step S13, the counter display value is restored by the control signal, an accurate counter display being permitted because the lag between the position of the magnetic tape 13 and the counter display value has already been removed. Then, when the start of the magnetic tape 13 is detected in step S8, step S9 follows and the rewind operation is stopped.

Thus, there is no lag in the position of the magnetic tape 13 during rewinding and an accurate counter display value can be achieved, and, therefore, in a case where, during tape editing, an operation permitting a switch to playback is performed by stopping the rewind operation through reference to the counter display value, rewinding can be stopped in the position of the next playback image sought, whereby the operability of the tape editing operation can be improved considerably.

Also, in the above embodiments, the run speed F1 of the magnetic tape 13 in the first take-up mode was 8 m/s and the run speed F2 of the magnetic tape 13 in the second take-up mode was 10 m/s. However, provided that the relation F1<F2 is satisfied, these speeds are not limited to such values.

The magnetic record and playback device of the present invention described above is provided with the second take-up mode that performs rewinding without winding the magnetic tape on the rotating head drum, in addition to the first take-up mode in which the magnetic tape is rewound by winding the magnetic tape on the rotating head drum. Because the magnetic tape transport speed of the second take-up mode is higher than the speed of the first take-up mode, the run load of the magnetic tape is reduced and hence it is possible to obtain superior results in that the fast forward/rewind time can be shortened, and the burden on the magnetic tape and the magnetic head can also be reduced, whereby damage is prevented.

Moreover, the magnetic record and playback device according to the present invention is a device comprising: a mode switching unit for switching a mechanism to an operation state that is either a first take-up mode corresponding to a state where the magnetic tape is wound on a rotating head cylinder, or a second take-up mode corresponding to a state where the magnetic tape is not wound on the rotating head cylinder; a tape driving unit for fast forwarding or rewinding the magnetic tape in a state corresponding to either the first take-up mode or the second take-up mode; and an end detecting unit for detecting the end of the magnetic tape, wherein the mode switching unit is constituted such that, when the end detecting unit detects the end during a fast forward operation by unit of the first take-up mode, the mode switching unit stops the fast forward operation and then switches the mechanism operating mode to the second take-up mode and stops the tape driving unit. Therefore, when rewinding from the end of the magnetic tape to the start thereof is performed in the second take-up mode, the time interval required for mode switching from the first take-up mode to the second take-up mode is removed and the rewind time can therefore be shortened.

Moreover, when rewinding in the first take-up mode is performed following a stop state in the second take-up mode, the rewind operation proceeds after a switch to the first mode has been made, the counter has been stopped and the magnetic tape has been transported as far as the end thereof. Therefore, it is possible to remove the lag of the counter display that results from the change in the mechanism operating mode, so that in a case where, during tape editing, an operation permitting a switching to playback is performed by stopping the rewind operation through reference to the counter display value, it is possible to stop the rewinding at the position of the next playback image sought, whereby the operability of the tape editing operation can be improved considerably.

What is claimed is:

1. A magnetic record and playback device for recording or playing back a signal in a state in which a magnetic tape is wound on a rotating head drum, comprising:
   a tape withdrawal unit for winding the magnetic tape on the rotating head drum at a predetermined angle;
   a mode switching unit for switching the tape withdrawal unit, in a fast forward or rewind operation for the magnetic tape, to a state corresponding to either a first take-up mode in which the magnetic tape is wound on the rotating head drum or a second take-up mode in which the tape is not wound thereon;
   a processor for determining whether to engage the first take up mode or the second take up mode in response to an instruction; and
   a tape driving unit for fast forwarding or rewinding the magnetic tape in the first take-up mode or second take-up mode,
   wherein speeds at which the magnetic tape is transported by the tape driving unit are such that the speed during the second take-up mode is set higher than the speed during the first take-up mode.

2. The magnetic record and playback device as set forth in claim 1, wherein a signal is recorded or played back in a state in which the magnetic tape withdrawn from a cassette is wound on the rotating head drum, and the mode switching unit switches the tape withdrawal unit, in the second take-up mode, to a state in which the magnetic tape is not withdrawn from the cassette.

3. The magnetic record and playback device as set forth in claim 1, wherein a signal is recorded or played back in a state in which the magnetic tape withdrawn from a cassette is wound on the rotating head drum, a control signal recorded on the magnetic tape is detected by unit of a control head, and in the second take-up mode, the mode switching unit switches the tape withdrawal unit from winding the magnetic tape on the rotating head drum to a state in which the magnetic tape is withdrawn into the cassette and does not contact the rotating head drum or the control head.

4. The magnetic record and playback device as set forth in claim 1, wherein a signal is recorded or played back in a state in which the magnetic tape withdrawn from a cassette is wound on the rotating head drum, a control signal recorded on the magnetic tape is detected by unit of a control head, and in the second take-up mode, the mode switching unit switches the tape withdrawal unit to a state in which the magnetic tape contacts the control head but is not wound on the rotating head.

5. A magnetic record and playback device for recording or playing back a signal in a state in which a magnetic tape is wound on a rotating head drum, comprising:
   a mode switching unit for switching a mechanism to an operation state that is either a first take-up mode corresponding to a state where the magnetic tape is wound on a rotating head cylinder, or a second take-up mode corresponding to a state where the magnetic tape is not wound on the rotating head cylinder;
   a processor for determining whether to engage the first take up mode or the second take up mode in response to an instruction;
   a tape driving unit for fast forwarding or rewinding the magnetic tape in a state corresponding to either the first take-up mode or the second take-up mode; and
   an end detecting unit for detecting the end of the magnetic tape,
   wherein when the end detecting unit detects the end during a fast forward operation by unit of the first take-up mode, the mode switching unit stops the fast forward operation and then switches the mechanism operating mode to the second take-up mode and stops the tape driving unit.

6. The magnetic record and playback device as set forth in claim 5, wherein when a rewind operation in the first take-up mode follows a stop state in the second take-up mode, rewinding executes after the mode switching unit switches to the first take-up mode and the magnetic tape has been transported as far as the end thereof by the tape driving unit.

7. The magnetic record and playback device as set forth in claim 6, wherein during transportation of the magnetic tape as far as the end thereof switching the mode switching unit stops the operation of a counter.

8. The magnetic record and playback device as set forth in claim 5, wherein the speed during the second take-up mode is faster than the speed during the first take-up mode.

9. A magnetic record and playback device, comprising:
   a tape transport unit configured to wind a magnetic tape on a rotating head drum at a predetermined angle;
   a first sub-mode, operable in a fast forward mode, in which the magnetic tape is wound on the rotating head drum;
   a second sub-mode, operable in the fast forward mode, in which the magnetic tape is not wound on the rotating head drum; and
   a processor for determining whether to engage the first sub-mode or the second sub-mode in response to an instruction; and
   wherein a speed at which the magnetic tape is transported during the second sub-mode is faster than during the first-sub mode.

10. The magnetic record and playback device of claim 9, further comprising a rewind mode, said first and second sub-modes being operable in said rewind mode.

11. A magnetic record and playback device, comprising:
    at least one guide member configured to guide magnetic tape, said at least one guide member being moveable between at least a first position in which the magnetic tape is wound on a rotating head drum, and a second position is which the magnetic tape is not wound on said rotating head drum;
    a mode selection switch, configured to selectively position the at least one guide member in said first position or said second position; and
    a tape driving module configured to fast forward the magnetic tape at a first speed when said at least one guide member is in said first position and to fast forward the magnetic tape at a second speed when said at least one guide member is in said second position, the second speed being faster than the first speed.

12. The magnetic record and playback device of claim 11, wherein said tape driving module is configured to rewind the magnetic tape at a third speed when said at least one guide member is in said first position and to rewind the magnetic tape at a fourth speed when said at least one guide member is in the second position, the fourth speed being faster than the third speed.

* * * * *